(12) United States Patent
Tanaka et al.

(10) Patent No.: US 6,513,983 B1
(45) Date of Patent: Feb. 4, 2003

(54) BALL BEARING

(75) Inventors: Katsuhiko Tanaka, Kanagawa (JP);
Keisuke Kimura, Kanagawa (JP);
Kazuhiro Uemura, Kanagawa (JP);
Shoji Noguchi, Kanagawa (JP);
Hiroshi Nakajima, Kanagawa (JP);
Toru Takamizawa, Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/633,844

(22) Filed: Aug. 7, 2000

Related U.S. Application Data

(63) Continuation-in-part of application No. 09/187,979, filed on Nov. 9, 1998, now abandoned.

(30) Foreign Application Priority Data

Nov. 7, 1997 (JP) .............................................. 9-305721

(51) Int. Cl.[7] ........................... F16C 19/02; F16C 33/66
(52) U.S. Cl. ...................................... 384/490; 384/462
(58) Field of Search ................................ 384/445, 450, 384/462, 464, 490

(56) References Cited

U.S. PATENT DOCUMENTS

| | | | |
|---|---|---|---|
| 5,782,563 A | 7/1998 | Muto et al. | 384/450 |
| 5,882,122 A | 3/1999 | Noguchi et al. | 384/496 |
| 5,904,426 A | 5/1999 | Tsuru et al. | 384/462 |

*Primary Examiner*—Thomas R. Hannon
(74) *Attorney, Agent, or Firm*—Sughrue Mion, PLLC

(57) ABSTRACT

A ball bearing comprises an inner ring, an outer ring and a plurality of balls disposed between inner and outer rings. The number of the balls is made to be not smaller than 10. Lubricant is also enclosed between the inner and outer rings in such a manner that the amount of the lubricant is regulated not more than 8% of the volume of a space between the inner and outer rings.

10 Claims, 5 Drawing Sheets

DISTRIBUTION OF NRRO MAXIMUM VALUE

DISTRIBUTION OF NRRO MAXIMUM VALUE

BALL BEARING

This application is a Continuation-in-Part of U.S. patent application Ser. No. 09/187,979, filed on Nov. 9, 1998 abandoned.

BACKGROUND OF THE INVENTION

1. Field of the Invention

The present invention generally relates to a ball bearing, and particularly to a ball bearing suitable for use in a spindle motor of an information equipment, an audio/video equipment, and especially of a magnetic or photomagnetic disk unit.

2. Description of the Related Art

A conventional ball bearing used in a spindle motor of a magnetic disk unit includes 7 to 10 balls as rollers disposed between inner and outer rings of the ball bearing. As for the material of the balls, high-carbon chromium bearing steel of HRC 63 to 67 in Rockwell hardness or Hv 772 to 900 in Vickers hardness has been used.

In a ball bearing having a seal or a seal plate on one of or each of opposite sides, generally, grease as lubricant is enclosed between inner and outer rings in order to prevent balls from being damaged in long-term high-speed rotations. The grease is enclosed between the inner and outer rings at the ratio of 10% to 15% of the volume of a space between the inner and outer rings.

Recently, with the development in improvement of a magnetic disk unit to make its capacity as well as recording density high, a spindle motor to be used in such a magnetic disk unit is required to be small in oscillation of Non-Repeatative-Runout (hereinafter abbreviated to "NRRO") and less in variation of the NRRO. Particularly, 70 nm or less NRRO is requested.

FIG. 5 shows a relationship between the number of balls of a ball bearing and the maximum value of NRRO when only one of the balls has a relative diameter difference of 60 nm while there is no relative diameter difference in the other balls. As shown in FIG. 5, it has been found that NRRO becomes smaller as the number of the balls is increased. Note that in the term "a relative diameter difference" means a difference in diameter between the balls.

Table 1 shows the maximum value of NRRO when the number of mountains in a swell (that is, integral harmonic undulation of the outer race track) and the number of balls are changed. Here, in the table, 0 means that the maximum value of NRRO is smaller than 1 nm.

Table 1

The maximum value of NRRO (nm) when the number of mountains in a swell (so called as an integral harmonic undulation) on an outer circumferential race track and the number of balls are changed

| | MN | | | | | | | | |
|---|---|---|---|---|---|---|---|---|---|
| NB | 2 | 3 | 4 | 5 | 6 | 7 | 8 | 9 | 10 |
| 7 | 7 | 129 | 130 | 7 | 2001 | 0 | 2003 | 7 | 0 |
| 8 | 0 | 6 | 0 | 6 | 0 | 1999 | 0 | 1999 | 0 |
| 9 | 1 | 0 | 130 | 130 | 0 | 1 | 2005 | 0 | 2006 |
| 10 | 0 | 6 | 0 | 0 | 0 | 6 | 0 | 2008 | 0 |
| 11 | 0 | 1 | 6 | 129 | 129 | 6 | 1 | 0 | 2003 |
| 12 | 0 | 0 | 0 | 0 | 0 | 0 | 0 | 0 | 0 |
| 13 | 0 | 1 | 6 | 0 | 130 | 130 | 0 | 6 | 1 |
| 14 | 0 | 0 | 0 | 6 | 0 | 0 | 0 | 6 | 0 |
| 15 | 0 | 0 | 1 | 0 | 0 | 130 | 129 | 0 | 0 |
| 16 | 0 | 0 | 0 | 6 | 0 | 0 | 0 | 0 | 0 |
| 17 | 0 | 0 | 1 | 0 | 6 | 0 | 131 | 131 | 0 |
| 18 | 0 | 0 | 0 | 0 | 0 | 0 | 0 | 0 | 0 |
| 19 | 0 | 0 | 0 | 1 | 6 | 0 | 0 | 131 | 131 |
| 20 | 0 | 0 | 0 | 0 | 0 | 6 | 0 | 0 | 0 |

Note that in above-mentioned Table 1, MN defines a number of mountains in a swell and NB indicates a number or balls.

As shown in Table 1, by the recent investigation by the present inventors, it has been found that it is effective to make the number of balls larger than the number of balls used in a conventional ball bearing which is 8 or 10, and to set the number of balls to a number having many divisors, such as 12, 14, 16 or 18, in order to reduce the influence of the swell on the race track surface of the inner and outer rings. That is, when the number of balls is 12, 14, 16 or 20 the maximum value of NRRO becomes extremely small, even if the number of mountains of the swell) (that is, integral harmonic undulation of the outer race track) is varied.

On the other hand, when the number of balls is increased without changing the inner diameter of the inner ring and the outer diameter of the outer ring, the ball diameter must be also reduced in design. Then, the race track of the inner and outer rings approaches a pitch circle so that the volume of a space between the inner and outer rings is reduced. Therefore, there is a problem that the amount of grease for lubrication which can be charged into the space is reduced. In addition, there has been found another problem that, when grease of 10% to 15% of the volume of the space is enclosed between the inner and outer rings, NRRO increases because of the stirring resistance of the grease, and scattering of NRRO also increases.

SUMMARY OF THE INVENTION

It is therefore an object of the present invention to solve the foregoing problems.

It is another object of the invention to provide a ball bearing in which NRRO is reduced, and variation of NRRO is also reduced.

In order to achieve the above object, according to an aspect of the present invention, provided is a ball bearing having a plurality of balls disposed between inner and outer rings; wherein the number of the balls is made to be not smaller than 10, and lubricant the amount of which is not more than 8% of the volume of a space between the inner and outer rings is enclosed between the inner and outer rings.

According to the present invention, the number of balls is made to be not smaller than 10, and lubricant not more than 8% of the volume of a space between the inner and outer rings is enclosed between the inner and outer rings. Accordingly, it is possible to prevent increase of the stirring resistance of the lubricant such as grease even if the number of balls is increased. It is therefore possible to reduce NRRO, and reduce variations of NRRO.

When the present invention is applied to a spindle motor ball bearing in a disk unit, it is possible to attain low NRRO and in turn high surface density in the disk unit.

The additional experiment teaches that when the diameter difference between the balls is set at 30 nm or smaller, the NRRO can be satisfied under the condition that the number of balls is 10 or larger and an amount of filling grease is 10% or less.

Further, in the case of a requested product whose NRRO is 100 nm or less in maximum amplitude, setting of the filling grease amount at 10% or less will suffice even if the number of balls is 8 or larger. That is, the above-object can also be achieved by a ball bearing, according to the other aspect of the present invention, comprising: an inner ring; an outer ring; 8 or more balls disposed between inner and outer rings, a diameter difference of the balls being not larger than 30 nm; and a lubricant enclosed between the inner and outer rings, wherein an amount of the lubricant is not more than 10% of the volume of a space between the inner and outer rings.

DETAILED DESCRIPTION OF THE PREFERRED EMBODIMENT

Figure 1:
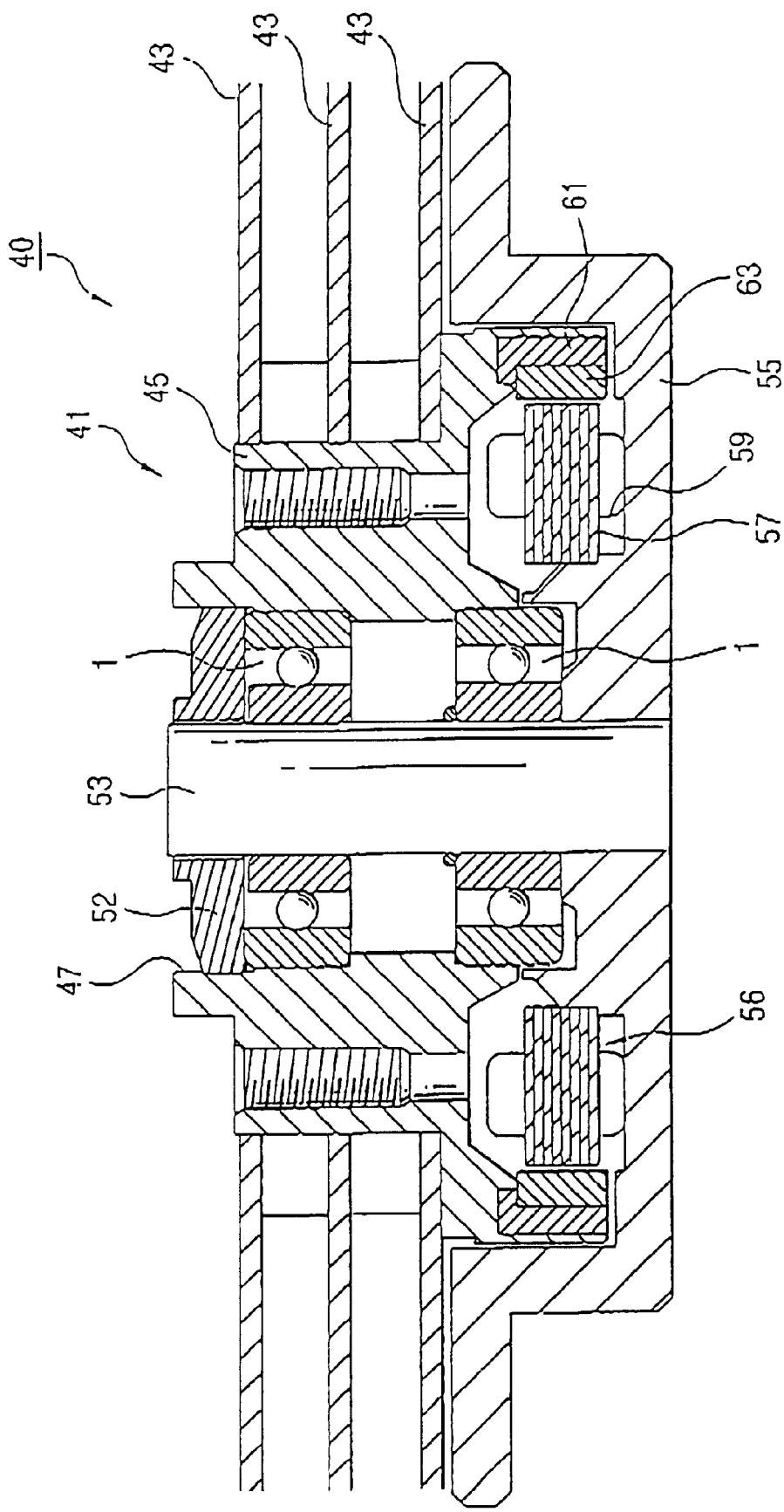
FIG. 1 is a sectional view of a spindle motor of a magnetic disk unit.
Figure 2:
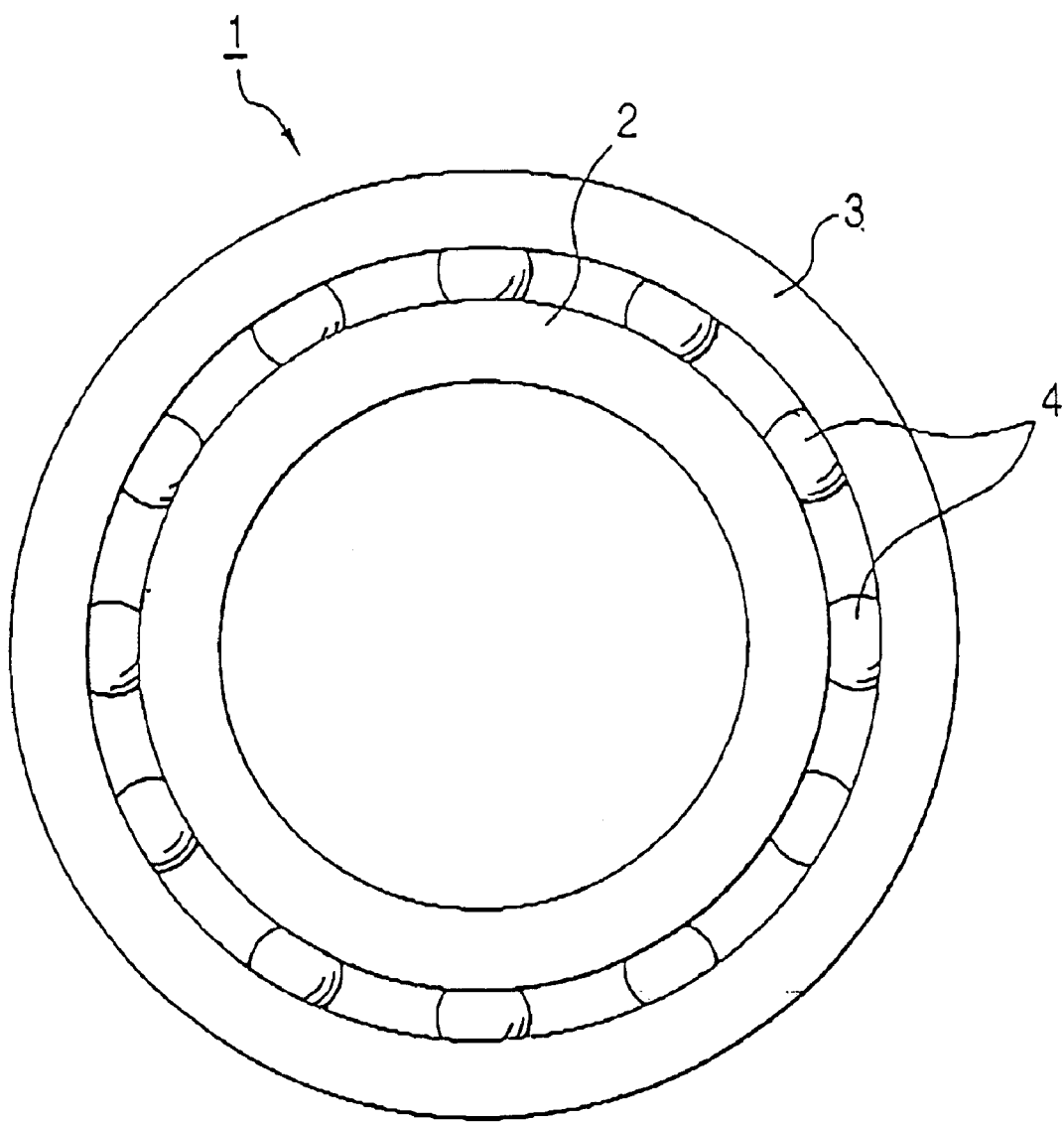
FIG. 2 is a sectional view of a ball bearing, according to an embodiment of the present invention, used for the spindle motor shown in FIG. 1.

An embodiment of the present invention will be described in detail with reference to the accompanying drawings. To describe the embodiment, FIG. 4 and Table 1 are employed suitably. FIG. 1 is a sectional view of a spindle motor of a magnetic disk unit. FIG. 2 shows a sectional view of a ball bearing according to an embodiment of the present invention which is applicable for the spindle motor shown in FIG. 1.

As shown in FIG. 1, a magnetic disk unit 40 is rotatably driven by a spindle motor 41. The spindle motor 41 comprises a general-disk-shaped hub 45, an insertion portion 47, a ball bearing 1, a labyrinth seal 52, a shaft 53 and a frame 55. The hub 45 acts as a rotating element on which a plurality of hard disks 43 are installed, and the insertion portion 47 acts as a hole formed by penetrating the hub 45 along with its axis. The ball bearing 1 is coaxially inserted and secured within the insertion portion 47. The labyrinth seal 52 prevents a vapor-shaped dust of a lubrication grease filled within the insertion portion 47 from being spread over the outside of the spindle motor 41. The shaft 53 supported by the ball bearing 1, and the frame 55 acts as a supporting member into which an end portion (the lower end in FIG. 1) of the shaft 53 is inserted under pressure.

In addition, a stator 56 is mounted on the frame 55. The stator 56 comprises a stator core which is formed by laminating a plurality of thin plates. A coil 59 is wound around the stator core 57. Further, a rotor 63 made of magnet is mounted through a yoke 61 at a position opposite to the stator core 57.

When the current is flown in the coil 59, an electromagnetic function is generated between the stator cores 57 and the rotor 63, and in turn generates a rotation torque of the rotor 63. Accordingly, the hub 45 on which the rotor 63 is mounted is rotated about the shaft 53 in such a manner that all of the hard disks 43 are rotated as an integral unit.

Although in the embodiment according to the present invention the spindle motor 41 of a circumferential surface opposed type in which the stator and the rotor are opposed in the circumferential direction is described, it is possible to use a spindle of a parallel surface opposed type in which the stator and the rotor are opposed in the axial direction.

As shown in FIG. 2, a ball bearing 1 for use in a spindle motor of a hard disk unit is constituted by an inner ring 2, an outer ring 3, a plurality of balls 4 disposed between the inner and outer rings 2 and 3, and so on. Grease, as one example of lubricant, being not more than 8% of the volume of a space between the inner and outer rings 2 and 3 is enclosed between the inner and outer rings 2 and 3. Although in the embodiment the grease is used as one example of the lubricant, it is possible to utilize oil or the like as the lubricant.

Note that "the volume of a space between the inner and outer rings 2 and 3" described in the specification means a volume of a space which is defined between the inner and outer rings 2 and 3 with a deduction of the volume of components (for example, balls, cage or the like) disposed therebetween.

Figure 3:
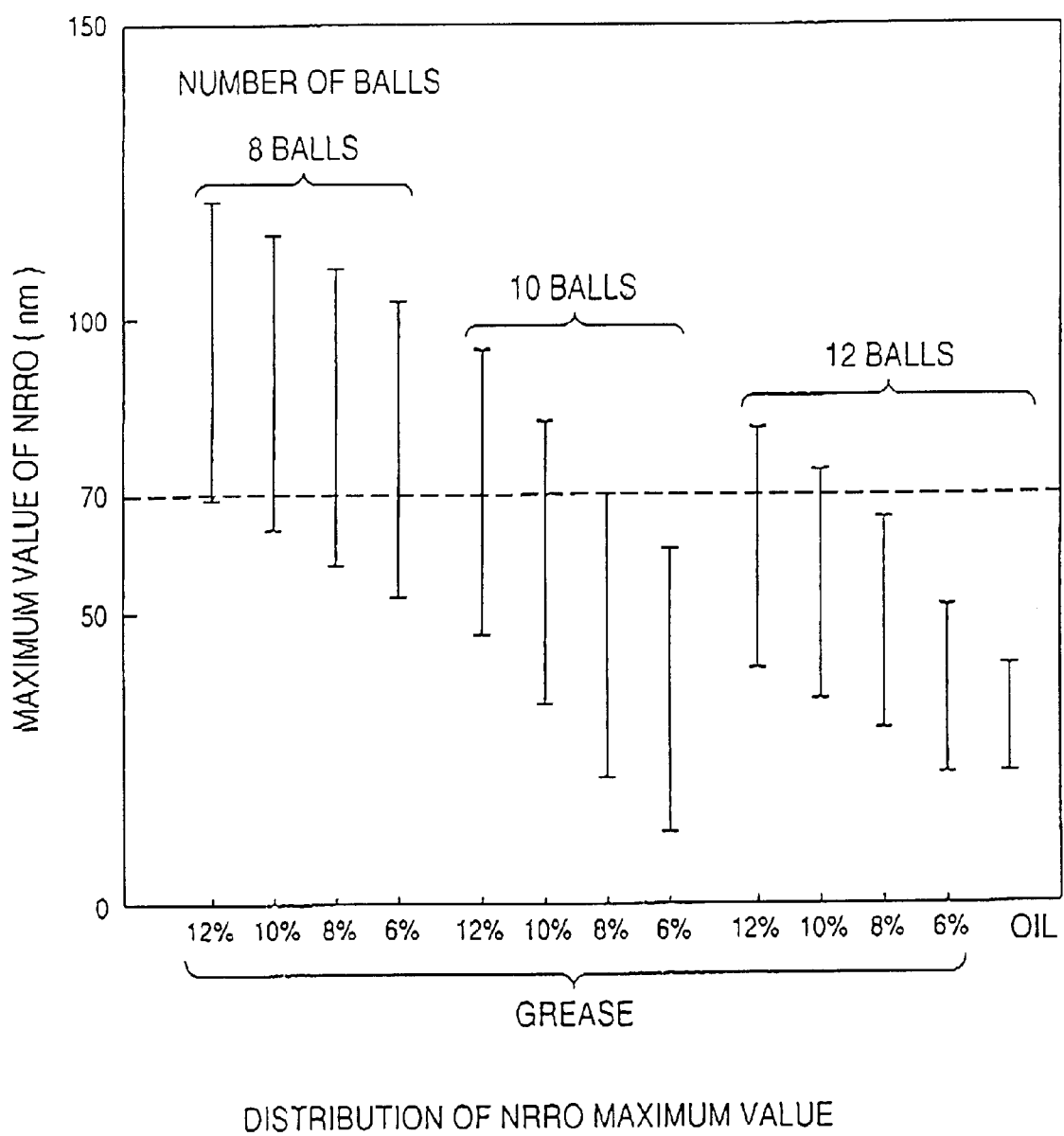
FIG. 3 is a diagram showing a relationship between the amount of grease and the maximum value of NRRO.

A relationship between the grease amount and the maximum value of the NRRO is shown in FIG. 3. Test conditions to obtain the relationship were:

Radial load: Fa=9.8N
Number of revolutions: 7200 rpm
Bearing used:
  (number of balls=8): OD13×ID5×W4 ball diameter= 2.0 mm
  (number of balls=10): OD13×ID5×W4 ball diameter= 1.588 mm
  (number of balls=12): OD13×ID5×W4 ball diameter= 1.2 mm
Ball diameter difference: Max 40 nm FIG. 3 shows a relationship between the amount of grease and the maximum value of NRRO. As shown in FIG. 3, in a ball bearing using 10 or 12 balls, NRRO can not become a value equal or less than 70 nm which is an allowance if grease is enclosed into a space between inner and outer rings by the amount of 10% of the volume of the space. On the contrary, when grease is enclosed into the space between inner and outer rings by the amount of 8% of the volume of the space, NRRO becomes not more than 70 nm. Thus, an effect of low NRRO begins to appear. It was found that the effect of low NRRO became more conspicuous when grease was enclosed by the amount of 6%. In addition, it was found that the effect of low NRRO was more conspicuous in the case of oil lubrication in which oil was poured and applied on a race track surface as a lubricant instead of conventional grease.

On the other hand, in a ball bearing using 8 balls, it was found that it was impossible to reduce NRRO to 70 nm or less even if grease was enclosed in a space between inner and outer rings by the amount of 8% of the volume of the space.

It is therefore understood that, if the number of balls is 10 or more, and if the amount of charged grease is not more than 8%, NRRO becomes 70 nm or less, so that low NRRO can be attained.

Figure 4:
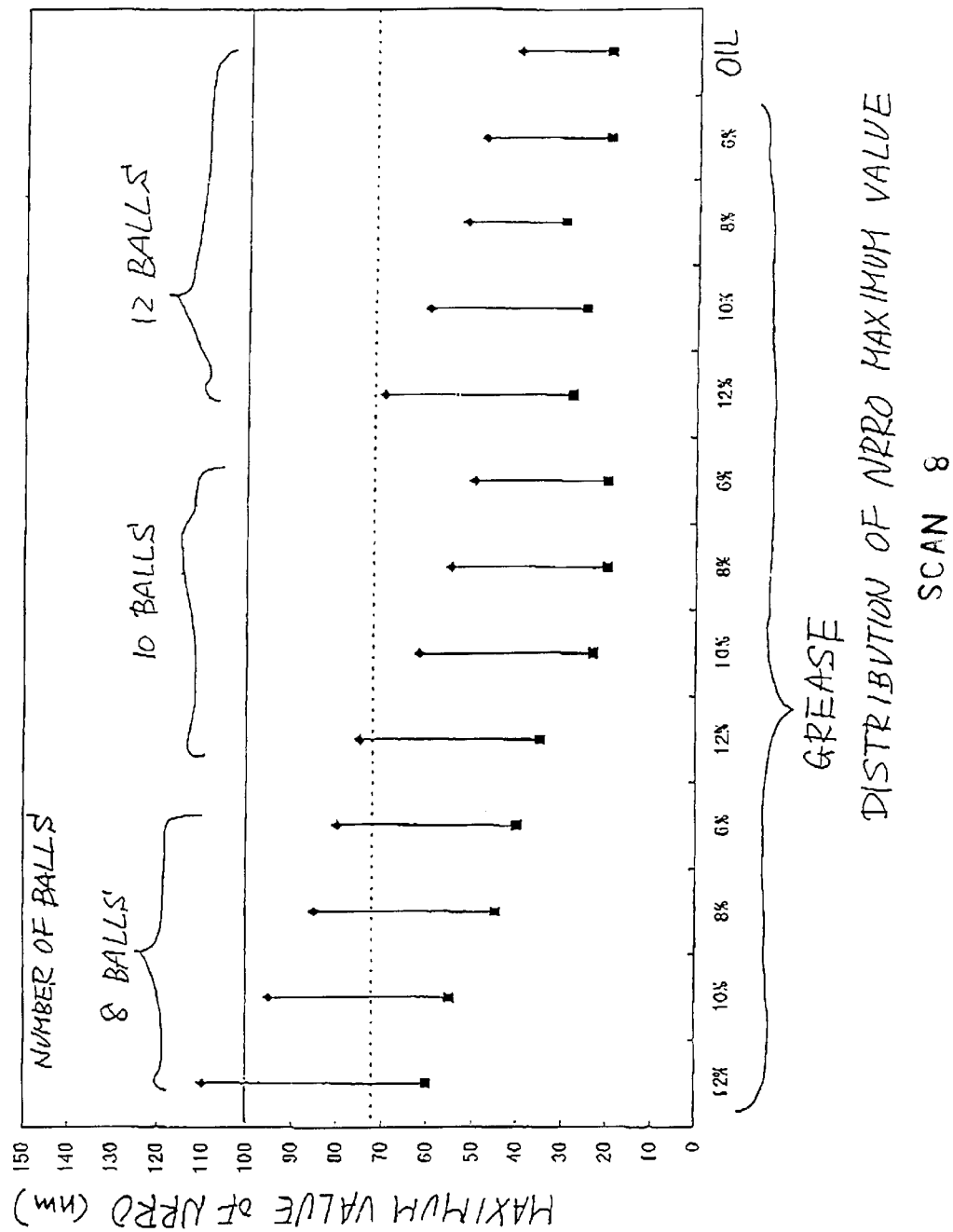
FIG. 4 is a diagram showing a relationship between the number of balls and the maximum value of NRRO.

A relationship between the grease amount and the maximum value of NRRO is shown in FIG. 4.

Radial load: Fa=9.8N
Number of revolutions: 7200 rpm
Bearing used:
   (number of balls=8): OD13×ID5×W4 ball diameter= 2.0 mm
   (number of balls=10): OD13×ID5×W4 ball diameter= 1.588 mm
   (number of balls=12): OD13×ID5×W4 ball diameter= 1.2 mm
Ball diameter difference: Max 30 nm A ball bearing using ten balls was tested. In this case, as shown in FIG. 4, when grease whose amount is 10% of a space volume between the inner and outer races is filled into the space, the NRRO is 70 nm or less within a tolerance value range, and the NRRO reducing effect begins to appear. When the grease of 8% was filled into the space, the NRRO reducing effect was more remarkable. In the oil lubrication (it is approximately zero in terms of the space volume) in which the race track surface is coated with the oil, which is used, in place of the conventional grease, for the lubricant, the NRRO reducing effect was much more remarkable. A ball bearing using eight balls was tested. In this case, when grease whose amount is 10% of a space volume between the inner and outer races is filled into the space, the NRRO was not lowered to be smaller than 70 nm. In a device which is satisfactorily operable with the NRRO of 100 nm or smaller, the tested ball bearing fairly satisfied the requirements of the device. When the diameter difference between the balls was 30 nm, the NRRO was 70 nm or smaller under the conditions that the number of balls is 10 or larger, and the grease filling amount is 10% or less. Accordingly, strict requirement of lowering the NRRO could be satisfied. As seen from the test results, a desired ball bearing can be produced by appropriately selecting the number of balls and the grease filling amount in connection with the required NRRO.

Figure 5:
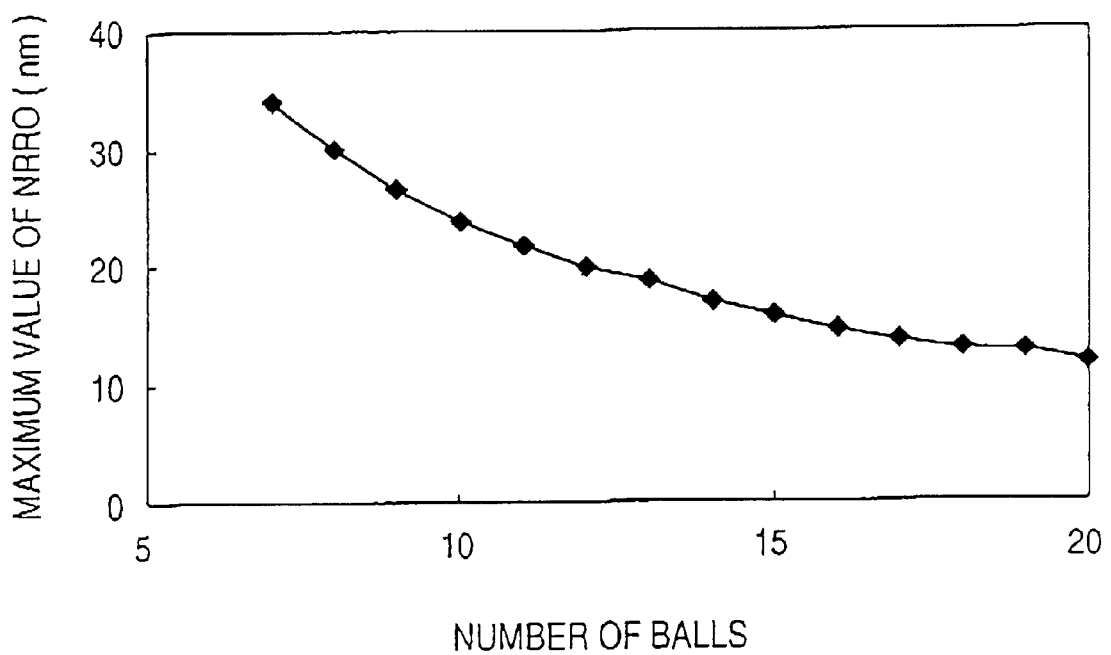
FIG. 5 is a diagram showing a relationship between the number of balls and the maximum value of NRRO when only one of balls in a ball bearing has a relative diameter difference of 60 nm, while there is no relative diameter difference in the other balls.

In addition, as shown in FIG. 5, it is effective to increase the number of balls in order to reduce NRRO. However, as shown in Table 1, it is effective to set the number of balls in a number having many divisors, such as 12, 14, 16 or 18, in order to reduce the influence of a swell on the race tracks of the inner and outer rings.

Therefore, to make NRRO be a value not larger than 70 nm, it has been found that it is necessary to use balls in which there is a diameter difference of not larger than 30 nm, make the number of the balls 10 or more, preferably 12, and make the amount of enclosed lubricant not more than 8% of the volume of a space in the ball bearing. In this contraction, it is possible to reduce the NRRO and its deviation, so that a surface density for recording and reproducing an information in the magnetic disk of the magnetic disk unit can be greatly improved.

If ceramic balls the surface hardness of which is Hv 1,400 to 2,200 are used as the balls, it is possible to prevent the ball surface from deteriorating with rotations under the depletion of lubrication in the case where the amount of enclosed lubricant is too small. Accordingly, there is an advantage that there is no acoustic deterioration under high-speed rotations, and acoustic life is superior even when the amount of grease is made not more than 4% or oil lubrication is adopted. Therefore, when ceramic balls are used, there is an advantage that low NRRO as well as high-speed durability can be satisfied.

Cemented carbide balls the surface hardness of which (Vickers hardness is Hv 950 to 1,800) is higher than high-carbon chromium steel, or nitriding balls (Vickers hardness is Hv 950 to 1,400) may be used instead of ceramic balls because ceramic balls are expensive. Also in this case, there is an effect of low NRRO and high-speed durability.

Accordingly, when this embodiment is combined with a ball bearing using balls the hardness of which exceeds Hv 900, it is possible to obtain a ball bearing which is superior in high-speed durability and small in NRRO.

As described above, according to the present invention, in a ball bearing having a plurality of balls disposed between inner and outer rings, the number of the balls is made to be not smaller than 10, and lubricant the amount of which is not more than 8% of the volume of a space between the inner and outer rings is enclosed between the inner and outer rings.

As has been described above, according to the present invention, it is possible to reduce NRRO and reduce variations of NRRO. Particularly when the present invention is applied to a spindle motor ball bearing in a hard disk unit (for example a magnetic disk unit, a photomagenetic disk unit or the like), it is possible to improve the life of the hard disk unit and the surface density of the hard disk.

Note that the ball bearing used for the spindle motor of the magnetic disk unit described as an embodiment of the present invention is applicable for another devices together with various modifications and changes.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball bearing comprising:
an inner ring;
an outer ring;
10 or more balls disposed between said inner and said outer rings, a diameter difference of said balls being not larger than 30 nm; and
a lubricant enclosed between said inner and said outer rings, wherein an amount of said lubricant is not more than 8% of the volume of a space between said inner and said outer rings, to thereby reduce a non-repeatable-runout of said ball bearing to be not more than 70 nm.

2. The ball bearing according to claim 1, wherein the amount of said lubricant is not more than 6% of the volume of a space between said inner and outer rings.

3. The ball bearing according to claim 1, wherein the number of balls is selected from the group consisting of 10, 12, 14, 16, 18 and 20.

4. The ball bearing according to claim 1, wherein each of said balls is made of ceramic and has a surface hardness in a range of Hv 1,400–2,200.

5. The ball bearing according to claim 4, wherein the amount of said lubricant is not more than 4% of the volume of a space between said inner and outer rings.

6. The ball bearing according to claim 1, wherein said ball bearing is installed in a spindle motor of a disk unit for rotatably supporting a rotation shaft of said spindle motor.

7. The ball bearing according to claim 6, wherein the amount of said lubricant is not more than 6% of the volume of a space between said inner and outer rings.

8. The ball bearing according to claim 6, wherein the number of balls is selected from the group consisting of 10, 12, 14, 16, 13 and 20.

9. The ball bearing according to claim 6, wherein each of said balls is made of ceramic and has a surface hardness in a range of Hv 1,400–2,200.

10. The ball bearing according to claim 9, wherein the amount of said lubricant is not more than 4% of the volume of a space between said inner and outer rings.

* * * * *